United States Patent
Jeong et al.

(10) Patent No.: US 8,248,989 B2
(45) Date of Patent: Aug. 21, 2012

(54) WIRELESS NETWORK SYSTEM USING CYCLIC FRAME

(75) Inventors: Wun Cheol Jeong, Daejeon (KR); Anseok Lee, Gyeongsangbuk-Do (KR); Chang Sub Shin, Daejeon (KR); Seong Soon Joo, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 308 days.

(21) Appl. No.: 12/553,635

(22) Filed: Sep. 3, 2009

(65) Prior Publication Data
US 2010/0111050 A1     May 6, 2010

(30) Foreign Application Priority Data

Nov. 5, 2008  (KR) .......... 10-2008-0109473
Aug. 11, 2009  (KR) .......... 10-2009-0074004

(51) Int. Cl.
*H04W 4/00* (2009.01)
*H04B 7/212* (2006.01)
*H04B 1/00* (2006.01)
*H04J 3/00* (2006.01)

(52) U.S. Cl. ........ 370/321; 370/330; 370/337; 370/345; 375/132

(58) Field of Classification Search .......... 370/310–350, 370/445–462, 535–545, 203–208, 436–437, 370/464–480, 498; 375/130–150; 455/450–464
See application file for complete search history.

(56) References Cited

U.S. PATENT DOCUMENTS

| | | | | |
|---|---|---|---|---|
| 5,568,510 A * | 10/1996 | Tam | ........ | 375/134 |
| 5,809,417 A * | 9/1998 | Nealon et al. | ........ | 455/426.1 |
| 6,052,407 A * | 4/2000 | Ciccone et al. | ........ | 375/133 |
| 7,088,702 B2 * | 8/2006 | Shvodian | ........ | 370/348 |
| 7,702,351 B2 * | 4/2010 | Soliman | ........ | 455/522 |
| 7,924,766 B2 * | 4/2011 | Sahinoglu et al. | ........ | 370/321 |
| 2009/0103501 A1* | 4/2009 | Farrag et al. | ........ | 370/337 |
| 2010/0034159 A1* | 2/2010 | Shin et al. | ........ | 370/329 |
| 2010/0260085 A1* | 10/2010 | Wang et al. | ........ | 370/311 |
| 2010/0296493 A1* | 11/2010 | Lee et al. | ........ | 370/336 |
| 2011/0038343 A1* | 2/2011 | Bhatti et al. | ........ | 370/330 |

FOREIGN PATENT DOCUMENTS

KR   10-2006-0055635   5/2006

OTHER PUBLICATIONS

Wun-Cheol Jeong, et al., "Cyclicframe Structure to enhance IEEE 802.15.4-2006 MAC," Project: IEEE P802.15 Working Group for Wireless Personal Area Networks (WPANs), Sep. 2008.

* cited by examiner

*Primary Examiner* — Tri H Phan
(74) *Attorney, Agent, or Firm* — Staas & Halsey LLP

(57) ABSTRACT

A wireless network system using a cyclic frame including a beacon period (BP), a mesh contention access period (MCAP), and a slot period (SP). The cyclic frame has a frame structure that shares a channel hopping sequence of a node, thereby sharing the channel hopping sequence that operates as an existing mesh node without generating an additional channel hopping sequence, and supporting mesh and star type topologies together in order to efficiently operate a network.

13 Claims, 5 Drawing Sheets

WIRELESS NETWORK SYSTEM USING CYCLIC FRAME

CROSS-REFERENCE TO RELATED PATENT APPLICATION

This application claims the benefit of Korean Patent Application Nos. 10-2008-0109473, filed on Nov. 5, 2008 and 10-2009-0074004, filed on Aug. 11, 2009, in the Korean Intellectual Property Office, the disclosure of which is incorporated herein in its entirety by reference.

BACKGROUND OF THE INVENTION

1. Field of the Invention

The present invention relates to a frame structure used in a medium access control (MAC) system using a channel hopping method, and more particularly, to a new frame structure for preventing a channel hopping sequence from being depleted due to an increase in the number of nodes in a MAC system operating on a wireless ad-hoc network, and a frame structure used to constitute a star network topology necessary to efficiently operate a network.

2. Description of the Related Art

A wireless sensor network relays and transmits sensing information in a multi-hop system using low power inexpensive nodes so that the sensing information may be used to provide a monitoring service. A wireless sensor network is installed and operated in an independently isolated radio frequency (RF) environment. However, when the wireless sensor network uses heterogeneous wireless devices (e.g. wireless local area network (LAN), Bluetooth, etc.) using the same RF band, the performance of a wireless communication system deteriorates due to signal interference. Frequent retransmission causes an increase in power consumption and a delay in transmitting the sensing information.

Wireless interference signals are divided into self-interference signals and mutual interference signals. Self-interference signals are generated by wireless devices that execute the same type of applications. Mutual interference signals are generated by different types of wireless devices that use the same RF band. Self-interference signals mainly use MAC methods such as a frequency division method using signal orthogonality, a time division method, a code division method, and the like.

The IEEE 802.15.4 MAC is a representative technology for realizing a real-time high reliability service in a low power based wireless sensor network.

However, a MAC system uses a single frequency during the use of a link and thus it is weak in terms of interference signals having the same RF band and is difficult to variably schedule a communication link bandwidth. Also, when limited wireless channels are hopped in the MAC system, an available channel hopping sequence is depleted due to an increase in the number of mesh nodes.

Sensing information of the wireless sensor network is required to minimize a transfer delay time according to an available application, which needs a flexible network structure comprising a combination of a perpendicular star topology that manages nodes of a network end for obtaining the sensing information as a single node and a peer-to-peer (mesh) topology that horizontally connects information collected in a star type end group and relays the information.

SUMMARY OF THE INVENTION

The present invention prevents channel interference that occurs when performing a single frequency based channel access method. The present invention prevents an available channel hopping sequence from being depleted due to an increase in the number of mesh nodes in a medium access control (MAC) system. The present invention provides an element for flexibly applying a star topology and a mesh topology according to requirements of an application layer of a network.

The present invention provides a frame structure that shares a channel hopping sequence of a node, thereby preventing conventional channel interference, sharing the channel hopping sequence that operates as an existing mesh node without generating an additional channel hopping sequence, and allowing the node to access a network having a star topology by using a star topology flag.

According to an aspect of the present invention, there is provided a wireless network system using a cyclic frame, wherein the cyclic frame includes a beacon period (BP) in which a plurality of nodes transmit beacons therebetween in the wireless network system; a slot period (SP) in which the plurality of nodes transmit data therebetween; and a mesh contention access period (MCAP) in which an operation of scheduling use of the BP and the SP is performed, wherein the BP, the SP, and the MCAP include at least one time slot, respectively.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
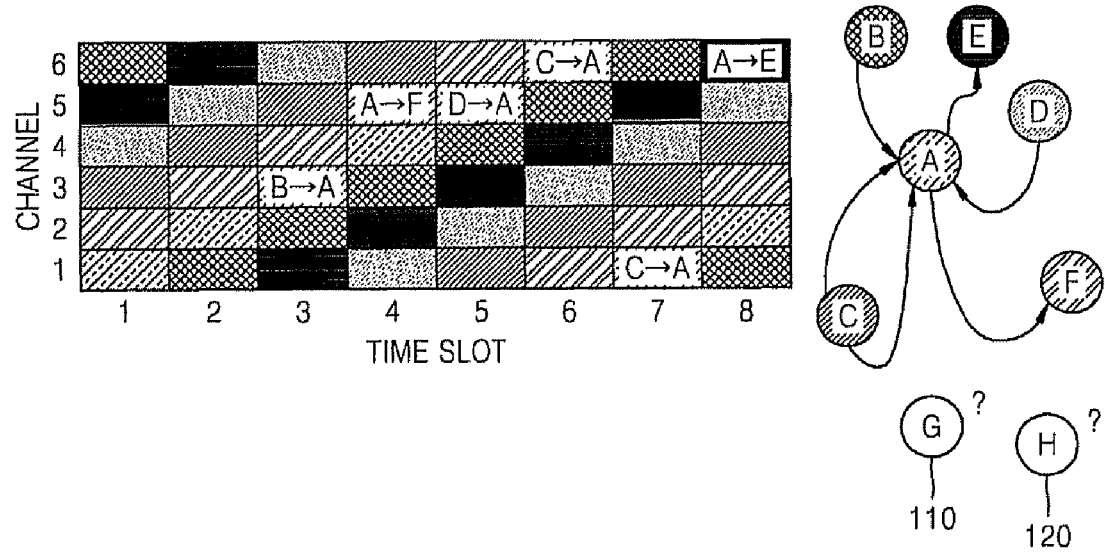
FIG. 1 is a diagram for explaining a new channel hopping pattern required by new network joining nodes in a mesh type network topology.

The present invention will now be described more fully with reference to the accompanying drawings, in which exemplary embodiments of the invention are shown. Like reference numerals denote like elements throughout. While describing the present invention, detailed descriptions of related well known functions or configurations that may obscure the description of the present invention will be omitted.

A channel hopping based time division medium access control (MAC) technology uses a multiple frequency channel division method and a time division method together. The channel hopping based time division MAC technology is relatively easily realized and thus it is used for a wireless sensor network requiring a low power simple structure system, a wireless personal area network (PAN), and a low power wireless ad-hoc network.

A plurality of wireless nodes that use the channel hopping based time division MAC technology access the network by using different wireless channels in time slots having the same size without wireless interference with other wireless nodes that already operate in the network.

Each node that operates in the network using the channel hopping based time division MAC technology uses wireless resources that do not overlap in terms of time and frequency regions with neighboring nodes, thereby obtaining signal orthogonality. Each node is individually provided with a channel hopping sequence in order to maintain the signal orthogonality.

However, a wireless link has difficulties in continuously maintaining a wireless connection having stability and reliability in terms of the characteristics of a communication medium. Thus, it is necessary to dynamically change a communication path in order to transfer reliable information between communication nodes in the wireless network. In this regard, a mesh type network topology that is a horizontal communication topology, e.g. a peer-to-peer topology, may be favorably used rather than having wireless network use a communication topology having a perpendicular layer structure.

FIG. 1 is a diagram for explaining a new channel hopping pattern required by new network joining nodes G 110 and H 120 in a mesh type network topology.

A plurality of nodes having the mesh type network topology need to have their own channel hopping sequence in a wireless network that uses a channel hopping based time division MAC technology. However, referring to FIG. 1, an available channel hopping sequence is depleted due to an increase in the number of mesh nodes in a limited wireless channel hopping system.

When a frequency channel hopping pattern of the nodes in a channel hopping based time division MAC system is saturated, if the network joining nodes G 110 and H 120 require a new channel hopping pattern, an additional channel hopping pattern is not generated. To address this problem, the present invention provides a frame structure that is to be used in a wireless channel access method using the channel hopping based time division method.

Figure 2A:
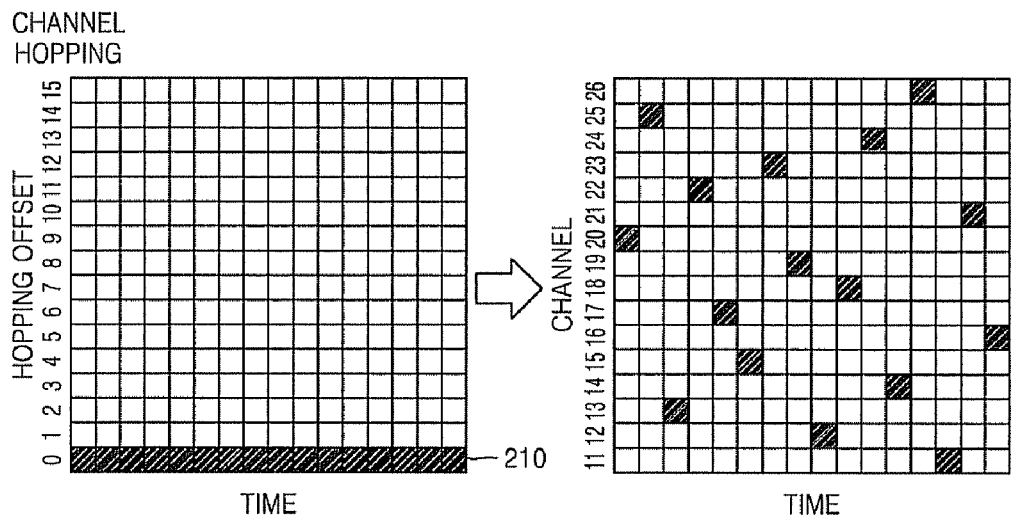
FIGS. 2A and 2B illustrate channel hopping patterns according to embodiments of the present invention.
Figure 2B:
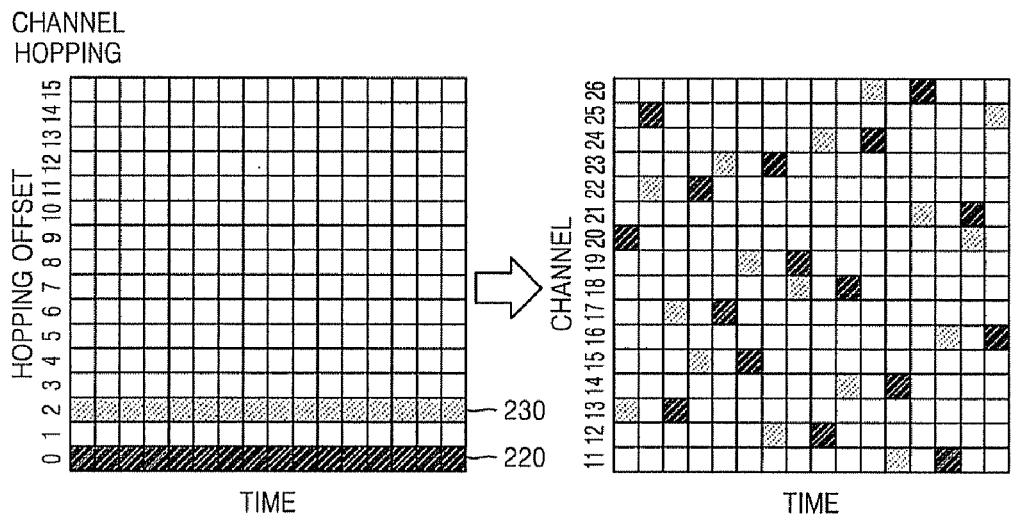

FIGS. 2A and 2B illustrate channel hopping patterns according to embodiments of the present invention.

A channel hopping sequence is commonly used in a whole network. Each node has its own offset value in relation to n-hop neighboring nodes (where n is a positive integer). Thus, the n-hop neighboring nodes use different channels during the same period of time.

When nodes (for example, 2-hop neighboring nodes) that use the same channel are in a collision region in a channel hopping structure, if packets are simultaneously transmitted, the packets collide. To prevent such a collision, different offset values must be allocated to nodes in the collision region.

The collision region is determined according to a distance of transmission, sensitivity of a receiver, and the like. The collision region in view of a protocol is generally regarded as n-hop neighboring nodes. To prevent packets from colliding, a region of n-hop neighboring nodes is considered in designing the protocol in the present embodiment. In this regard, the protocol of the present embodiment may be extended to a network including neighboring nodes of more than n hops.

Referring to FIG. 2A, the channel hopping operates when an offset value is 0 (210). The channel hopping operates by changing channels according to the previously determined hopping pattern. For example, the channel hopping pattern is 20, 25, 13, 22, 17, . . . .

Referring to FIG. 2B, an offset value is 2 in two nodes that use 16 channels. In this case, the channel hopping pattern is 20, 25, 13, 22, 17, . . . in a channel hopping sequence 220 when the offset value is 0, and the channel hopping pattern is 13, 22, 17, 15, . . . in a channel hopping sequence 230 when the offset value is 2.

In the present embodiment, the channel hopping method shown in FIGS. 2A and 2B is combined with a time division multiple access (TDMA) method and thus neighboring nodes transmit beacons through different channels. Also, since beacons are received from different neighboring nodes through different channels, it is possible to stably operate a network in spite of an interference signal.

Figure 3:
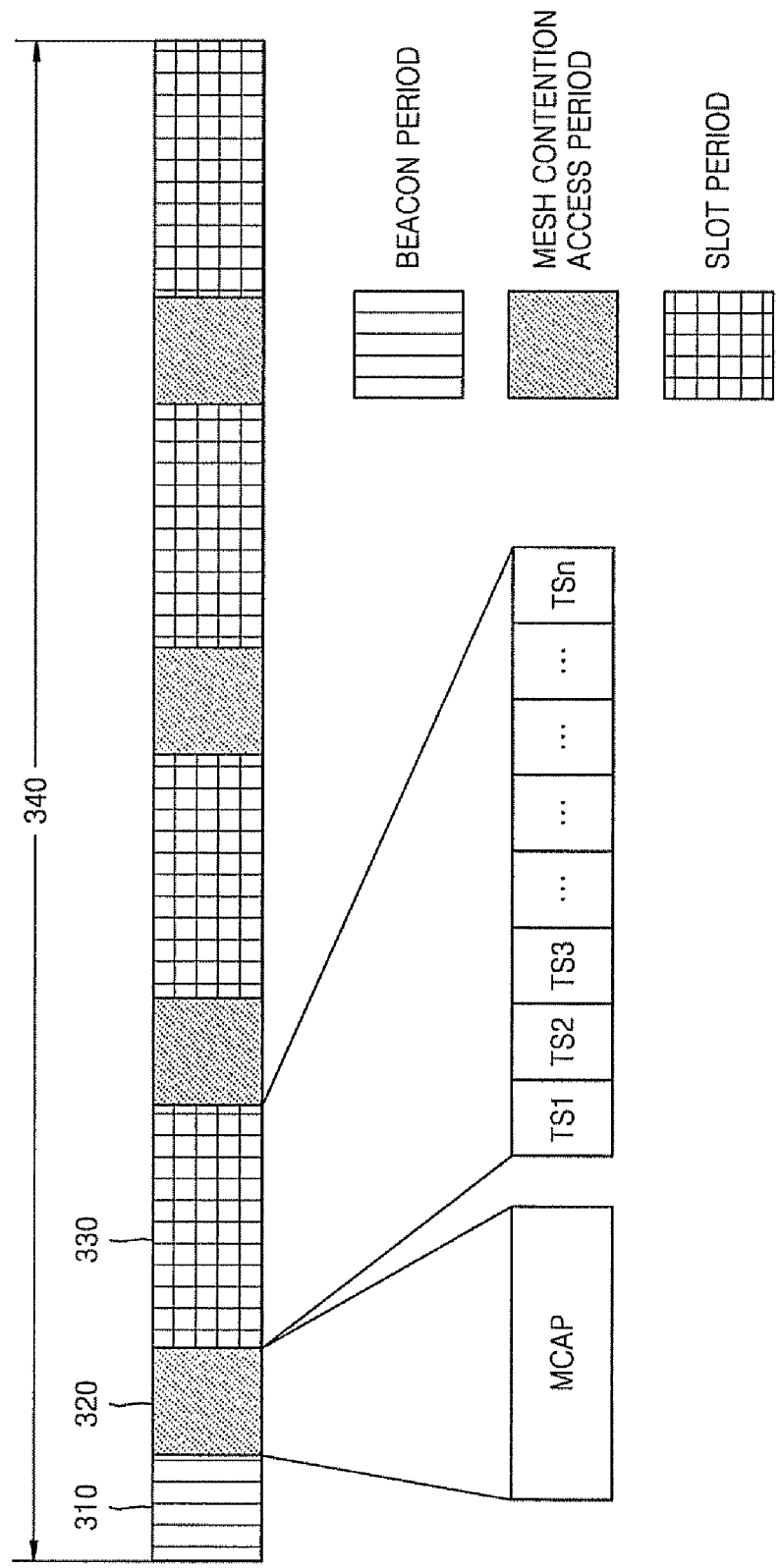
FIG. 3 illustrates a cyclic frame according to an embodiment of the present invention.

FIG. 3 illustrates a cyclic frame according to an embodiment of the present invention. Referring to FIG. 3, the cyclic frame includes a plurality of beacon periods (BPs) 310, a plurality of mesh contention access periods (MCAPs) 320, and a plurality of slot periods (SPs) 330. The BPs 310, the MCAPs 320, and the SPs 330 include at least one time slot, respectively. The number of time slots included in each of the BPs 310, the MCAPs 320, and the SPs 330 may change according to an objective of the network.

The BPs 310 are used to transmit beacons between nodes. Beacon frames only can be transmitted in the BPs 310. The BPs 310 include the structure information of the cyclic frame. The structure information of the cyclic frame includes a beacon period interval value (BI) 340, a BP, a flag indicating whether a star topology is supported, time information, and channel hopping information such as a channel hopping sequence, an offset value, and the like. A renewal period of channel hopping sequence information or time information may be dynamically changed according to an available application or a wireless environment.

The time information included in the BPs 310 is used for channel access in a time division manner. The BPs 310 have a structure including at least one time slot. The length of each time slot is longer than the time necessary to transmit a single beacon frame.

The cyclic frame may include the number of the MCAPs 320 and the SPs 330 corresponding to the number of beacon time slots. For descriptive convenience, it is assumed that the number of beacon time slots is N (N is a natural number). If the BPs 310 include N beacon time slots, the cyclic frame may include the N MCAPs 320 and the N SPs 330. The length of the BPs 310 is variably determined according to a corresponding application and thus the whole length of the cyclic frame, i.e. the BI 340, is variably determined.

N, the number of beacon time slots of the BPs 310, is determined by a value established by a network coordinator (a PAN coordinator), and may change according to the size of a network and the number of nodes included in the network. The greater the network or the more nodes included in the network, the greater the number N of the beacon time slots, and vice versa.

An extremely large beacon time slot increases a portion of the BPs 310 to the BI, which may increase power consumption of the networks.

However, the BPs 310 of the present invention access channels based on a schedule and thus a BP that is not scheduled does not incur an additional power loss.

The MCAPs 320 are used to constitute a mesh topology. In the MCAPs 320, the time slots of the BPs 310 or the SPs 330 are scheduled to be used. However, the MCAPs 320 may exchange data with regard to a single emergency message or an inefficient scheduling message. The constituting of the mesh topology in the MCAPs 320 will be described with reference to FIG. 4.

The length of the MCAPs 320 has a dynamic value. Information about the dynamic value is described in the BPs 310. The MCAPs 320 of the present embodiment include a control signal and transmit data using the time slots of the SPs 330.

The control message or the control signal uses a competition based channel access method that does not need a scheduling operation in the MCAPs 320. However, a scheduling operation is a prerequisite to use the time slots of the SPs 330 in order to transmit data.

A data control signal (for example, link information indicating a place where data is included) is sent and the number of data messages is minimized in the MCAPs 320, thereby reducing the probability of the occurrence of a packet collision in a conventional MCAP.

The SPs 330 are used to transmit data between nodes. The SPs 330 are used to exchange data frames between nodes that are allowed to access channels in the MCAPs 320. Nodes that have succeeded in receiving a bandwidth through a competition in the MCAPs 320 use a single time slot or a plurality of time slots to transmit data frames as scheduled in the SPs 330.

Figure 4:
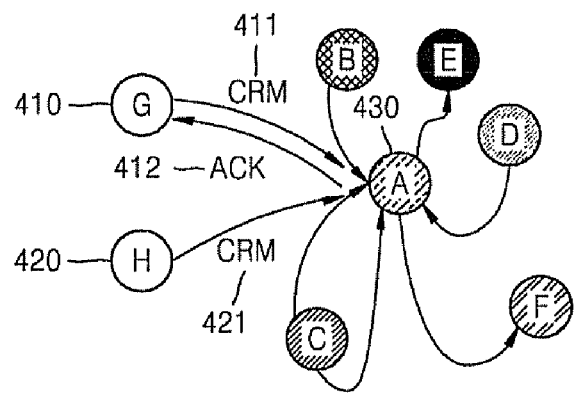
FIG. 4 is a diagram for explaining an operation performed in a mesh contention access period (MCAP) of a cyclic frame according to an embodiment of the present invention.

FIG. 4 is a diagram for explaining an operation performed in a MCAP of a cyclic frame according to an embodiment of the present invention. Referring to FIG. 4, nodes 410 and 420 that desire to join a network transmit channel request messages (CRMs) 411 and 421 during the MCAP of the cyclic frame in order to access channels. The CRMs 411 and 421 include an address of a sending node, an address of a receiving node, a traffic length indicator (TLI), an additional information field, etc.

When the TLI is established to be true, the additional information field includes information about the urgency of information to be sent, a request bandwidth, a sensing information type, a value of a channel hopping sequence of the sending node, and an offset value of the channel hopping sequence.

If a plurality of nodes desire to access channels, the nodes transmit a plurality of CRMs. In this case, each node uses carrier sense multiple access with collision avoidance (CSMA/CA) to access the channels to prevent collisions of frames.

A node 430 that receives the CRMs 411 and 421 compares the request bandwidth included in the CRMs 411 and 421 with the number of available frequency channels and available time slots included in a queue of the node 430, and transmits an ACK frame 412.

Figure 5:
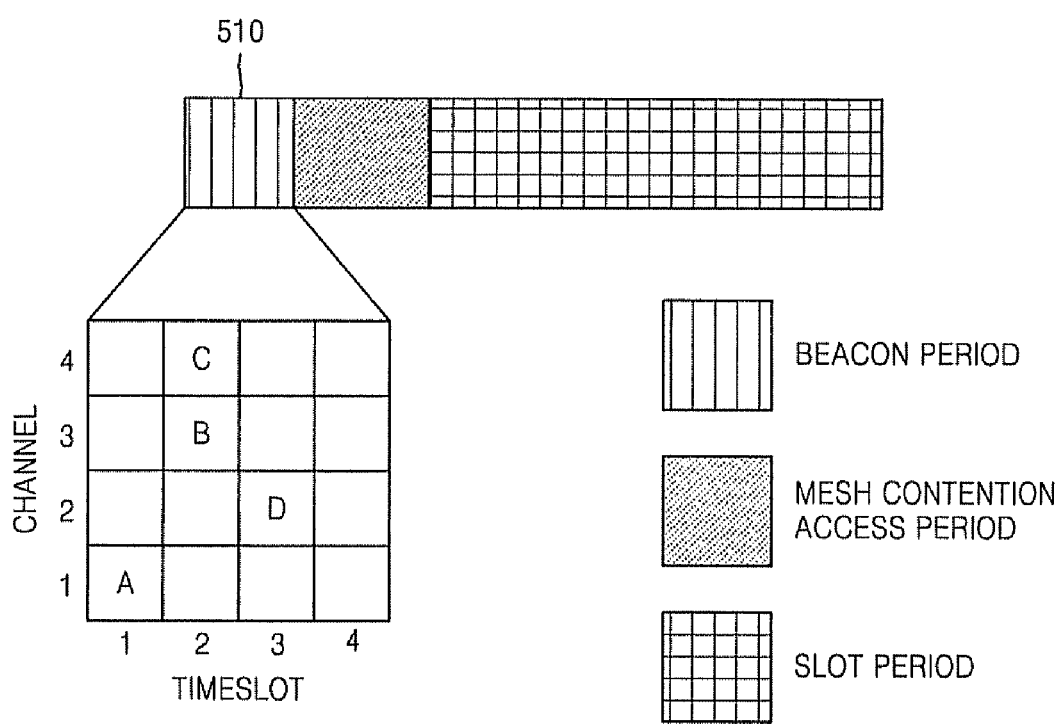
FIG. 5 illustrates a beacon period (BP) in which a scheduling operation is performed by combining time division multiple access (TDMA) and channel hopping according to an embodiment of the present invention.

FIG. 5 illustrates a BP in which a scheduling operation is performed by combining TDMA and channel hopping according to an embodiment of the present invention. Referring to FIG. 5, each of a plurality of router nodes selects a channel used for each of a plurality of time slots based on an offset value allocated to the router nodes, thereby preventing interference between neighboring nodes. A coordinator node A that has first transmitted a beacon transmits the beacon to a first time slot. Router nodes receiving the beacon B and C are informed of the offset value of the coordinator node A and the transmission of the first time slot and receive the beacon after changing their channels to a channel used by the coordinator node A in the first time slot.

Each router relays a beacon received therein to its own channel and notifies neighboring nodes about the relay, so that the neighboring nodes can receive the beacon. In this manner, all nodes of a network establish beacon receiving and transmitting time.

In more detail, it is assumed that the number of channels is 4, and a channel hopping pattern is {1, 2, 3, 4}. Offset values 0, 1, 2, and 3, respectively, are allocated to four nodes A, B, C, and D.

The node A that is a PAN coordinator node is scheduled to transmit its own beacon to a first time slot of the BP. All nodes excluding a network coordinator (e.g. the PAN coordinator) receive a beacon frame of at least one neighboring nodes and transmit their own beacon frames in order to transmit beacon frames from the network coordinator to the network. Thus, information received from the network coordinator can be quickly transmitted to the whole network.

The node A uses its own channel, a first channel in the first time slot to broadcast its own beacon. In this regard, neighboring nodes B and C are supposed to receive the beacon of the node A in the first time slot. An offset value of the node A is used to receive the beacon after changing a channel to the first channel used by the node A in the first time slot.

The nodes B and C transmit their own beacons in a second time slot. The node B uses its own channel, a third channel, in the second time slot, to broadcast its own beacon. The node C broadcasts its own beacon through its own channel, a fourth channel. In this regard, two nodes included in a collision region simultaneously can broadcast their beacons by using the channel hopping method of the present invention.

A node D is scheduled to receive the beacon from the node B. The node D uses the offset value of the node B to change a channel into the third channel used by the node B in the second time slot, and receives the beacon from the node B.

The node D transmits its own beacon in a third time slot. In the same manner as described above, the node D uses its own offset value to broadcast the beacon through its own channel, the second channel, in the third time slot.

Figure 6:
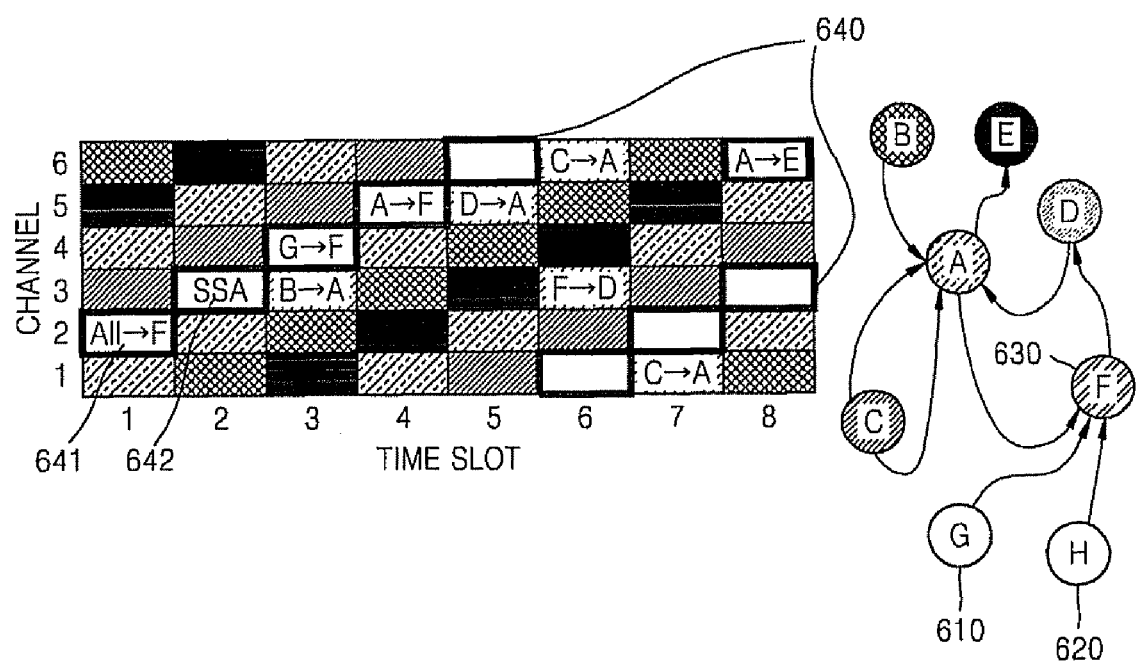
FIG. 6 is a diagram for explaining a channel hopping pattern shared by nodes according to an embodiment of the present invention.

FIG. 6 is a diagram for explaining a channel hopping pattern shared by nodes according to an embodiment of the present invention.

If a scheduling operation is performed as described with reference to FIGS. 4 and 5, data frames are exchanged in a SP. Two nodes share the same channel in a specific time slot in order to exchange data frames. In the present embodiment, a transmission node moves to a channel of a reception node and transmits data frames. Thereafter, the transmission node recovers an original channel hopping pattern.

The reception node receives a frame in the same time slot as the time slot in which the frame is transmitted and sends an ACK frame indicating that data has been successfully transmitted to the transmission node. In this regard, the reception node uses channel hopping to transmit data frames.

Each node has a specific channel hopping pattern that does not overlap other nodes. The channel hopping pattern is established as a channel hopping sequence and an offset value of the channel hopping sequence.

However, when a new node enters a network, a channel hopping pattern may overlap between nodes since the number of available physical frequency channels is limited. In this case, the node cannot perform mesh type channel hopping based channel access any longer.

Therefore, the present invention provides a method of sharing a channel hopping pattern that has been used between nodes.

When nodes G 510 and H 520 join the network, the nodes G 510 and H 520 receive channels during at least one beacon interval. In the MCAPs 320, the nodes G 510 and H 520 do not perform channel hopping and the existing nodes access channels through CSMA/CA in an existing channel (a common channel), and thus a new node that desires to join the network receives a control signal through the common channel in the MCAPs 320.

Nodes that have joined the network transmit CRM frames in order to request the time slots in the SPs 330. The nodes G 510 and H 520 receive beacon frame information broadcasted from a node F 530 that desires to share the channel hopping pattern with the nodes G 510 and H 520. The node F 530 obtains hopping information of the channel in which the node F 530 to be hopped in the SPs 330.

If the node F 530 has a spare time slot, the node F 530 sets a flag supporting a star topology of a beacon frame to be true and uses first and second time slots to transmit and receive a control frame of a node that desires to share a channel hopping sequence of the node F 530.

In more detail, if the flag supporting the star topology of the node F 530 is set to be true, a first time slot 641 among a hopping pattern 640 to be used by the node F 339 in the SPs 330 is used to receive CRMs of the node G 610 and H 620 that desire to share the channel hopping pattern. A second time slot 642 is used to broadcast a time slot schedule to nodes that succeed in requesting channels among nodes that have transmitted the CRMs.

That is, the first time slot 641 is used to receive CRMs of a plurality of nodes that desire to share channel hopping resources. In this regard, a CSMA/CA type medium access method is used to transmit a CRM frame in order to allow the nodes that desire to share the channel hopping resources to access channels. Also, unlike the MCAPs 320, an ACK is not immediately transmitted in response to the CRM frame, and, after all CRMs are received, all nodes that succeed in requesting channels are informed of a next time slot.

If there is no spare time slot, the node F 330 sets the flag supporting the star topology of the node F 530 to be false, and uses the first and second time slots 641 and 642 to exchange data frames for mesh communication.

A frame structure of a time division based channel hopping ad-hoc communication system of the present invention shares limited hopping sequence resources and supports an extension of a network according to an increase in the number of nodes without additional frequency resources by using a channel hopping based time division channel access method.

The extension of the network is supported by increasing the number of logical channels without extending the number of physical channels and a frequency diversity gain provided by using the channel hopping access method is obtained, thereby increasing the strength of a wireless link and the service quality.

A control frame exchange period and the number of time slots are dynamically allocated so as to allow channel access of a node that desires to share the channel hopping resources, thereby increasing the utilization of frequency channels.

A first time slot of a SP is used to receive a channel request frame so as to share the channel hopping resources, after receiving all CRMs, and a schedule of a node that succeeds in requesting a channel in a second time slot is broadcasted. Thus, a node that requests a channel enters an idle state after transmitting its own CRM, and enters a normal state to receive a transmission schedule in the second time slot, which does not turn a wireless transceiver on during a control signal exchange period, thereby reducing power consumed due to communication.

The frame structure of the present invention dynamically utilizes an available link bandwidth, which prevents the use of a frequency from decreasing according to a channel access method using a regular control channel, thereby increasing the lifetime of the network according to the increase in the reliability of communication and use of frequency in an ad-hoc network having extremely limited wireless resources or in a sensor network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wireless network system using a cyclic frame, wherein the cyclic frame comprises:
    a beacon period (BP) in which a plurality of nodes transmit beacon frames therebetween in the wireless network system;
    a slot period (SP) in which the plurality of nodes transmit data frames therebetween; and
    a mesh contention access period (MCAP) in which an operation of scheduling use of the BP and the SP is performed,
    wherein the BP, the SP, and the MCAP include at least one time slot, respectively, wherein each node of the wireless network system has a previous established offset value, changes channels according to a previously determined hopping pattern.

2. The system of claim 1, wherein a number of time slots included in the BP is variably determined according to a size of a network and a number of nodes included in the network.

3. The system of claim 1, wherein a number of MCAPs that are to be included in the cyclic frame and SPs are variably determined to correspond to a number of time slots included in the BP.

4. The system of claim 1, wherein the BP comprises structure information of the cyclic frame,
    wherein the structure information of the cyclic frame comprises a beacon period interval value (BI) indicating a whole length of the cyclic frame, a BP, a flag indicating whether a star topology is supported, time information, and channel hopping information such as a channel hopping sequence and an offset value.

5. The system of claim 4, wherein, if the flag indicating whether the star topology is supported is set to be true, some time slots included in the SP is are set to receive a channel request message (CRM) and a time slot request or to broadcast a time slot schedule.

6. The system of claim 1, wherein the MCAP comprises a control signal for controlling transmission of the data, and data that is required to be scheduled is transmitted in the SP.

7. The system of claim 1, wherein a node that desires to join a wireless network transmits a CRM in the MCAP by using a competition based channel access method, and
    a node that receives the CRM in the wireless network immediately sends an ACK message.

8. The system of claim 7, wherein the CRM comprises an address of a sending node, an address of a receiving node, a length of transmission data, a channel hopping sequence, and channel hopping information.

9. The system of claim 1, wherein the at least one time slot included in the BP and the SP are scheduled in the MCAP by using a time division multiple access (TDMA) method.

10. The system of claim 1, wherein each node of the wireless network system has a previously established offset value, changes channels according to a previously determined hopping pattern, and, if a position of a time slot in which a plurality of neighboring nodes transmit data frames is determined, receives a data frame through a channel corresponding to the previously determined hopping pattern of the plurality of neighboring nodes in the determined time slot.

11. A wireless network system using a cyclic frame, wherein the cyclic frame comprises:
    a beacon period (BP) in which a plurality of nodes transmit beacon frames therebetween in the wireless network system;

a slot period (SP) in which the plurality of nodes transmit data frames therebetween; and a mesh contention access period (MCAP) in which an operation of scheduling use of the BP and the SP is performed, wherein said slot period follows immediately after the mesh contention access period (MCAP).

12. A wireless network system using a cyclic frame, wherein the cyclic frame comprises:

a beacon period (BP) in which a plurality of nodes transmit beacon frames therebetween in the wireless network system;

a slot period (SP) in which the plurality of nodes transmit data frames therebetween; and a mesh contention access period (MCAP) in which an operation of scheduling use of the BP and the SP is performed, wherein a transmission node in the wireless network system moves to a channel of a reception node in the wireless network system and transmits data frames in order to exchange data frames.

13. The system of claim 12, wherein the reception node sends an ACK frame to the transmission node when the reception node receives the data frames successfully.

* * * * *